US008711248B2

(12) United States Patent
Jandhyala et al.

(10) Patent No.: US 8,711,248 B2
(45) Date of Patent: Apr. 29, 2014

(54) GLOBAL ALIGNMENT FOR HIGH-DYNAMIC RANGE IMAGE GENERATION

(75) Inventors: Radhika Jandhyala, Bellevue, WA (US); Yongjun Wu, Bellevue, WA (US); Shijun Sun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 13/035,883

(22) Filed: Feb. 25, 2011

(65) Prior Publication Data

US 2012/0218442 A1 Aug. 30, 2012

(51) Int. Cl.
H04N 5/262 (2006.01)
H04N 5/228 (2006.01)
H04N 5/235 (2006.01)

(52) U.S. Cl.
USPC ...... 348/239; 348/362; 348/208.4; 348/208.1

(58) Field of Classification Search
USPC .............. 348/239, 362, 208.4, 208.1, 208.12, 348/415.1, 416.1, 218.1; 375/240.16
See application file for complete search history.

(56) References Cited

U.S. PATENT DOCUMENTS

| | | | |
|---|---|---|---|
| 5,259,040 A | 11/1993 | Hanna | |
| 5,629,988 A | 5/1997 | Burt et al. | |
| 5,973,733 A | 10/1999 | Gove | |
| 6,097,854 A | 8/2000 | Szeliski et al. | |
| 7,010,174 B2 | 3/2006 | Kang et al. | |
| 7,061,524 B2 | 6/2006 | Liu et al. | |
| 7,119,837 B2 | 10/2006 | Soupliotis et al. | |
| 7,227,896 B2 | 6/2007 | Sun | |
| 7,346,109 B2 | 3/2008 | Nair et al. | |
| 7,454,136 B2 | 11/2008 | Raskar et al. | |
| 7,489,341 B2 | 2/2009 | Yang et al. | |
| 7,557,832 B2 | 7/2009 | Lindenstruth et al. | |
| 7,649,549 B2 | 1/2010 | Batur | |
| 2005/0099504 A1 | 5/2005 | Nayar et al. | |
| 2006/0066728 A1 | 3/2006 | Batur | |
| 2006/0274156 A1 | 12/2006 | Rabbani et al. | |
| 2006/0280334 A1 | 12/2006 | Rav-Acha | |
| 2007/0014470 A1 | 1/2007 | Sloan | |
| 2007/0201560 A1 | 8/2007 | Segall et al. | |
| 2007/0242900 A1* | 10/2007 | Chen et al. | 382/294 |
| 2007/0292047 A1 | 12/2007 | Jiao et al. | |

(Continued)

FOREIGN PATENT DOCUMENTS

EP  0986252  3/2000

OTHER PUBLICATIONS

U.S. Appl. No. 12/197,922, filed Aug. 25, 2008, Sun et al.
U.S. Appl. No. 12/700,292, filed Feb. 4, 2010, Sun.

(Continued)

*Primary Examiner* — Nhan T Tran
(74) *Attorney, Agent, or Firm* — Carole Boelitz; Micky Minhas

(57) ABSTRACT

Techniques and tools for high dynamic range ("HDR") image generation and rendering are described herein. In several described embodiments, images having distinct exposure levels are aligned. In particular embodiments, the alignment of a reference image to a non-reference image is based at least in part on motion vectors that are determined using covariance computations. Furthermore, in certain embodiments, saturated areas, underexposed areas, and/or moving objects are ignored or substantially ignored during the image alignment process. Moreover, in certain embodiments, a hierarchical pyramid block-based scheme is used to perform local motion estimation between the reference image and the non-reference image.

18 Claims, 10 Drawing Sheets

(56) References Cited

U.S. PATENT DOCUMENTS

| | | | |
|---|---|---|---|
| 2007/0297513 A1 | 12/2007 | Biswas et al. | |
| 2009/0051777 A1 | 2/2009 | Lee et al. | |
| 2009/0180555 A1 | 7/2009 | Sun et al. | |
| 2009/0256918 A1 | 10/2009 | Rabinowitz et al. | |
| 2009/0263009 A1 | 10/2009 | Krishnaswamy et al. | |
| 2010/0183071 A1 | 7/2010 | Segall et al. | |
| 2010/0208087 A1* | 8/2010 | Ogawa | 348/208.4 |
| 2010/0271512 A1* | 10/2010 | Garten | 348/239 |
| 2011/0019014 A1* | 1/2011 | Oh et al. | 348/208.4 |
| 2012/0105654 A1* | 5/2012 | Kwatra et al. | 348/208.4 |

OTHER PUBLICATIONS

U.S. Appl. No. 12/704,047, filed Feb. 11, 2010, Wu et al.
Battiato et al., "A Robust Video Stabilization System by Adaptive Motion Vectors Filtering," *2008 IEEE Int'l Conf. on Multimedia and Expo*, 4 pp. (Jun. 23, 2008).
Battiato et al., "Fuzzy-based Motion Estimation for Video Stabilization using SIFT interest points," *Proc. of SPIE*, vol. 7250, 8 pp. (Jan. 19, 2009).
Bergen et al., "Hierarchical Model-Based Motion Estimation," *Proc. of the Second European Conf. on Computer Vision*, 16 pp. (1992).
Bill Crow's Digital Imaging & Photography Blog, "JPEG XR is Now an International Standard," 2 pp., downloaded from http://blogs.msdn.com/b/billcrow/archive/2009/07/29/jpeg-xr-is-now-an-international-standard.aspx (document marked Jul. 29, 2009).
Debevec et al., "Recovering High Dynamic Range Radiance Maps from Photographs," *Proc. 24th Annual Conf. on Computer Graphics and Interactive Techniques*, 10 pp. (1997).
Drago et al., "Design of a Tone Mapping Operator for High Dynamic Range Images based upon Psychophysical Evaluation and Preference Mapping," *SPIE Proc. on Human Vision and Electronic Imaging VIII*, vol. 5007, pp. 321-331 (Jun. 2003).
Duran et al., "Fast Bilateral Filtering for the Display of High-Dynamic-Range Images," *Proc. 29$^{th}$ Annual conf. on Computer Graphics and Interactive Techniques*, vol. 21, No. 3, pp. 257-266 (Jul. 2002).
Fattal et al., "Gradient Domain High Dynamic Range Compression," *Proc. Annual Conf. on Computer Graphics and Interactive Techniques*, vol. 21, Issue 3, 8 pp. (Jul. 2002).
Gallo et al., "Artifact-free High Dynamic Range Imaging," *IEEE Int'l Conf. on Computational Photography*, 7 pp. (Apr. 2009).
Lucas et al., "An Iterative Image Registration Technique with an Application to Stereo Vision," *Proc. 7$^{th}$ Int'l Joint Conf. on Artificial Intelligence*, vol. 2, pp. 674-679 (Aug. 1981).
Mann et al., "Painting with Looks: Photographic images from video using quantimetric processing," *ACM Multimedia*, 10 pp. (2002).
Mitsunaga et al., "Radiometric Self Calibration," *IEEE*, pp. 374-380 (Jun. 1999).
Nayar et al., "High Dynamic Range Imaging: Spatially Varying Pixel Exposures," *IEEE Proc. on Computer Vision and Pattern Recognition*, vol. 1, pp. 472-479 (Jun. 2000).
Peng et al., "DSP Implementation of Digital Image Stabilizer," *IEEE Int'l Conf. on Multimedia and Expo*, 4 pp. (Jul. 2005).
Qiu et al., "Hierarchical Tone Mapping for High Dynamic Range Image Visualization," *Proc. SPIE Visual Communications and Image Processing*, vol. 5960, 9 pp. (Jun. 2005).
Reinhard et al., "Photographic Tone Reproduction for Digital Images," *Proc. 29$^{th}$ Annual conf. on Computer Graphics and Interactive Techniques*, vol. 21, No. 3, pp. 267-276 (Jul. 2002).
Tang, "HDR Photos and Photoshop," 13 pp., downloaded from http://photoshoptutorials.ws/photoshop-tutorials/general/basics/hdr-photos-and-photoshop.html (document marked Apr. 6, 2008).
Tang, "Layered HDR Tone Mapping," 12 pp., downloaded from http://photoshoptutorials.ws/photoshop-tutorials/photo-manipulation/layered-hdr-tone-mapping.html (document marked May 30, 2007).
Tsin et al., "Statistical Calibration of CCD Imaging Process," *IEEE Proc. Int'l Conf. on Computer Vision*, 8 pp. (Jul. 2001).
Wikipedia, "Covariance," 3 pp., downloaded from http://en.wikipedia.org/wiki/Covariance (document marked Feb. 18, 2011).
Wikipedia, "Cross-correlation," 4 pp., downloaded from http://en.wikipedia.org/wiki/Cross-correlation#Normalized_cross-correlation (document marked Dec. 16, 2009).
Wikipedia, "High dynamic range rendering," 7 pp., downloaded from http://en.wikipedia.org/wiki/High_dynamic_range_rendering (document marked Dec. 29, 2009).
Wikipedia, "Sum of absolute differences," 2 pp., downloaded from http://en.wikipedia.org/wiki/Sum_of_absolute_differences (document marked Jan. 21, 2011).
Zimmer et al., "Freehand HDR Imaging of Moving Scenes with Simultaneous Resolution Enhancement," 24 pp. (document marked Dec. 2010).

\* cited by examiner

DOWNSAMPLING FOR PYRAMIDAL BLOCK MOTION ESTIMATION

GLOBAL ALIGNMENT FOR HIGH-DYNAMIC RANGE IMAGE GENERATION

FIELD

The technology relates to generating and rendering digital images, and more particularly to generating and rendering high dynamic range ("HDR") digital images.

BACKGROUND

In digital imaging systems, color generally is represented by coordinates in a multi-dimensional "color space" having three or more channels. Common examples include the well-known RGB and YUV color spaces. In the RGB color space, pixels are specified using coordinates (also referred to as pixel sample values or sample values) that represent intensities of red, green and blue light, respectively. In the YUV color space, pixels are specified using coordinates (pixel sample values or sample values) that represent a luminance value and two chrominance values.

Currently, many image capture, processing, and display devices can only handle pixel sample values having a small dynamic range of 256 ($2^8$) discrete values per channel, represented by 8 bits. Such images can be described as having a "bit depth" of 8 bits. In a typical RGB digital image having 8 bits per channel (8 bpc) in red, green and blue color channels, only 256 different values are possible for each of the red, green and blue pixel sample values. Other values (e.g., alpha or opacity values, luminance values, and other such values) also may be constrained by low dynamic range limitations. Some devices can handle up to a 10- or 12-bit dynamic range per channel. However, the human vision system can detect a wide luminance range of 14 orders of magnitude, which translates to around 46 bits. Luminance values in nature can be as high as $10^8$ candela/$m^2$ in bright sunlight, and as low as $10^{-6}$ candela/$m^2$ on the underside of a rock on a moonless night.

High dynamic range ("HDR") imaging presents a more versatile and natural image representation in line with the human vision system. HDR images can present a dynamic range higher than the traditional 8-bit, 10-bit and 12-bit representations to achieve a far higher image quality. HDR images can be used in the same kinds of devices and software tools that process conventional images if the HDR image format is compatible with the device or tool. Several HDR image formats have been developed, and cameras, computer graphics, and display devices have begun to produce, process and display images with increasing dynamic ranges.

SUMMARY

Techniques and tools for high dynamic range ("HDR") image generation and rendering are described herein. In certain embodiments, HDR images are constructed from a collection of lower dynamic range images. For example, HDR images can be generated by merging images taken at different exposures from the same camera for the same scene. However, due to hand shaking or environmental conditions, some camera motion (typically rotational and/or translational) should be expected between each picture. When HDR images are constructed from lower dynamic range images, aligning the images is one aspect of the HDR image generation process. This alignment process can be challenging, however, due to the differences between the images caused by the camera motion and caused by the different exposures at which the various images are taken. Thus, among the several described embodiments are techniques and tools for aligning images having distinct exposures. In particular embodiments, the alignment of the images is based at least in part on motion vectors that are determined using covariance computations between the images. Furthermore, in certain embodiments, saturated areas, underexposed areas, and/or moving objects with local motions are ignored or substantially ignored during the image alignment process. For example, in certain implementations, a Random Sample Consensus ("RANSAC") method is used to detect and eliminate motion vectors that are outliers due to a moving object, saturation, and/or under exposure.

In some embodiments of the disclosed technology, knowledge of an image capture device's response curve is not needed in advance of the image generation. Furthermore, embodiments of the disclosed technology do not normalize the images prior to alignment, and therefore preserve more information to align images more accurately. Embodiments of the disclosed technology can be used to correct both translational, rotational, or both translation and rotational motion. Further, embodiments of the disclosed technology are more computationally efficient than previous HDR generation techniques.

In one exemplary embodiment disclosed herein, motion analysis is performed between a reference image and a set of one or more non-reference images. The motion analysis can comprise computing one or more covariance values between a set of pixel sample values in the reference image and a set of pixel sample values in one of the non-reference images from the set. Further, based at least in part on the motion analysis, at least the one of the non-reference images from the set can be merged with the reference image to form a higher dynamic range digital image.

In another embodiment disclosed herein, a reference image is received, the reference image comprising a digital image at a first exposure level and at a first time. A non-reference image is also received, the reference image comprising a digital image at a second exposure level and at a second time, the second exposure level being different than the first exposure level, and the second time being different than the first time. Two or more local motion vectors are estimated for the non-reference image relative to the reference image. In particular implementations, the estimating of the two or more local motion vectors comprises downsampling the non-reference image and the reference image one or more times to form a plurality of versions of the non-reference image and the reference image at a plurality of resolutions, wherein a lowest resolution version of the non-reference image has a plurality of blocks associated as a pyramid structure to a successively larger number of blocks at corresponding locations in each higher resolution version of the non-reference image, and wherein a lowest resolution version of the reference image has a plurality of blocks associated as a pyramid structure to a successively larger number of blocks at corresponding locations in each higher resolution version of the reference image. Further, for the lowest resolution version of the non-reference image, motion vectors of the blocks of the non-reference image can be estimated by performing a full search for motion vectors in the associated lowest resolution version of the reference image; and for each successively higher resolution version of the non-reference image, motion vectors of the blocks of the successively higher resolution version of the non-reference image can be estimated using a refinement search starting from the motion vector estimated for the associated block of the preceding lower resolution version of the non-reference image according to the pyramid structure.

Another embodiment disclosed herein comprises a memory storing an image alignment program, at least one digital signal processing component, and a processing unit operable to execute the image alignment program. In certain embodiments, the image alignment program causes the processing unit to input a reference image, the reference image comprising a digital image at a first exposure level and at a first time; input a non-reference image, the reference image comprising a digital image at a second exposure level and at a second time; and compute a local motion vector for a block of pixel sample values in the non-reference image indicating relative motion of the block to a corresponding block of pixel sample values in the reference image. In particular implementations, the local motion vector is determined at least in part using a metric measuring how the pixel sample values in the block in the non-reference image change together with the pixel sample values in the block in the reference image.

This summary is provided to introduce a selection of concepts in a simplified form that is further described below. This summary is not intended to identify key features or essential features of the claimed subject matter, nor is it intended to be used as an aid in determining the scope of the claimed subject matter. Additional features and advantages of the disclosed technology will be made apparent from the following detailed description of embodiments that proceeds with reference to the accompanying drawings.

DETAILED DESCRIPTION

I. General Considerations

Figure 1:
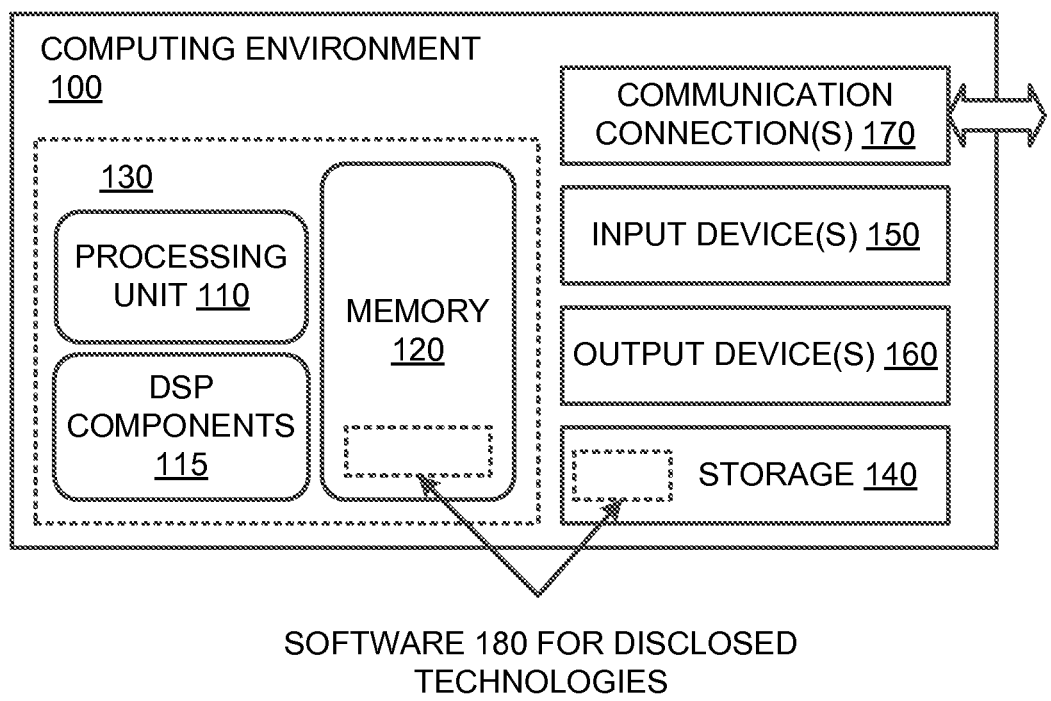
FIG. 1 is a block diagram of a computing environment in which embodiments of the high dynamic range ("HDR") image generation, rendering, and alignment techniques can be practiced.

Disclosed below are representative embodiments of methods, apparatus, and systems for performing HDR image processing, including the aligning of digital images having different exposures. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used alone or in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Furthermore, as used herein, the term "and/or" means any one item or combination of items in the phrase.

The disclosed methods can be implemented using computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives)) and executed on a computer (e.g., any commercially available computer or a computer or image processor embedded in a device, such as a laptop computer, entertainment console, net book, web book, tablet computing device, smart phone, or other mobile computing device). Any of the intermediate or final data created and used during implementation of the disclosed methods or systems can also be stored on one or more computer-readable media (e.g., non-transitory computer-readable media) and are considered to be within the scope of the disclosed technology.

For clarity, only certain selected aspects of the software-based embodiments are described. Other details that are well known in the art are omitted. For example, it should be understood that the software-based embodiments are not limited to any specific computer language or program Likewise, embodiments of the disclosed technology are not limited to any particular computer or type of hardware. Exemplary computing environments suitable for performing any of the disclosed software-based methods are introduced below.

The disclosed methods can also be implemented using specialized computing hardware that is configured to perform any of the disclosed methods. For example, the disclosed methods can be implemented by an integrated circuit (e.g., an application specific integrated circuit ("ASIC") (such an ASIC digital signal process unit ("DSP"), a graphics processing unit ("GPU"), or programmable logic device ("PLD"), such as a field programmable gate array ("FPGA")) specially designed or configured to implement any of the disclosed methods (e.g., dedicated hardware configured to perform any of the disclosed image processing techniques).

The disclosed HDR image generation, HDR image rendering, or digital image alignment techniques can also be used in a variety of usage and computation scenarios, including image processing on a dedicated image capture device (e.g., a digital camera or a mobile device with a digital camer), image processing on a stand-alone computer, image processing on a network client computer, or image processing on a server computer. Further, various parts of the disclosed HDR image generation, HDR image rendering, or digital image alignment techniques technique can be performed in parallel or cooperatively on multiple computing devices, such as in a client/server, network "cloud" service or peer computing arrangement, among others. Accordingly, it should be recognized that the techniques can be realized on a variety of different electronic and computing devices, including both end user consumer operated devices as well as server computers that may provide the techniques as part of a service offering to customers.

II. Example Computing Environments

FIG. 1 illustrates a generalized example of a suitable computing device environment or computing hardware environment 100 in which embodiments of the disclosed technology can be implemented. The computing hardware environment 100 is not intended to suggest any limitation as to the scope of use or functionality of the disclosed technology, as the technology can be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network (e.g., a cloud computing network). In a distributed computing environment, program modules may be located in both local and remote memory storage devices.

With reference to FIG. 1, the computing hardware environment 100 includes at least one processing unit 110 and memory 120. In FIG. 1, this most basic configuration 130 is included within a dashed line. The processing unit 110 executes computer-executable instructions. In a multi-processor system, multiple processing units execute computer-executable instructions to increase processing power. The memory 120 can be volatile memory (e.g., registers, cache, RAM, DRAM, SRAM), non-volatile memory (e.g., ROM, EEPROM, flash memory), or some combination of the two. The memory 120 can store software 180 for implementing one or more of the disclosed HDR image processing or image alignment techniques. For example, the memory 120 can store software 180 for implementing any of the disclosed methods.

In addition to the central processing unit 110, the computing environment can include other processing resources, such as digital signal processing DSP or multimedia components 115. The DSP components 115 can be any of the resources that can be utilized advantageously for the digital image alignment techniques disclosed herein. For example, the DSP components can include multimedia DSP ASIC units, GPU shader units, a multicore CPU, advanced multimedia instruction sets for the CPU, or the like.

The computing hardware environment can have additional features. For example, the computing hardware environment 100 includes a storage device 140, one or more input devices 150, one or more output devices 160, and one or more communication connections 170. An interconnection mechanism (not shown) such as a bus, controller, or network interconnects the components of the computing hardware environment 100. Typically, operating system software (not shown) provides an operating environment for other software executing in the computing hardware environment 100, and coordinates activities of the components of the computing hardware environment 100.

The storage device 140 is a type of non-volatile memory and can be removable or non-removable. The storage device 140 includes, for instance, non-transitory computer readable media such as magnetic disks (e.g., hard drives), magnetic tapes or cassettes, optical storage media (e.g., CD-ROMs or DVDs), or any other tangible non-transitory storage medium that can be used to store information and which can be accessed within or by the computing hardware environment 100. The storage device 140 can also store the software 180 for implementing any of the described techniques.

The input device(s) 150 can be a touch input device such as a keyboard, mouse, touch screen, pen, trackball, a voice input device, a scanning device, or another device that provides input to the computing environment 100 (e.g., an image sensing device). The output device(s) 160 can be a display device, touch screen, printer, speaker, or another device that provides output from the computing environment 100.

The communication connection(s) 170 enable communication over a communication medium to another computing entity. The communication medium conveys information such as computer-executable instructions, any of the intermediate or final messages or data used in implementing embodiments of the disclosed technology. By way of example, and not limitation, communication media include wired or wireless techniques implemented with an electrical, optical, RF, infrared, acoustic, or other carrier.

The various methods disclosed herein (e.g., any of the disclosed HDR image processing or image alignment techniques) can be described in the general context of computer-executable instructions stored on one or more computer-readable storage media (e.g., tangible non-transitory computer-readable storage media such as memory 120 and storage 140). As should be readily understood, the terms computer-readable storage media or non-transitory computer-readable media includes the media for storage of data and program instructions such as memory 120 and storage 140, and not modulated data signals alone.

The various methods disclosed herein can also be described in the general context of computer-executable instructions, such as those included in program modules, being executed by a processor in a computing environment. Generally, program modules include routines, programs, libraries, objects, classes, components, data structures, and other such software elements that perform particular tasks or implement particular abstract data types. The functionality of the program modules may be combined or split between program modules as desired in various embodiments. Any of the disclosed methods can also be performed using a distributed computing environment (e.g., a client-server network, cloud computing environment, wide area network, or local area network).

Figure 2:
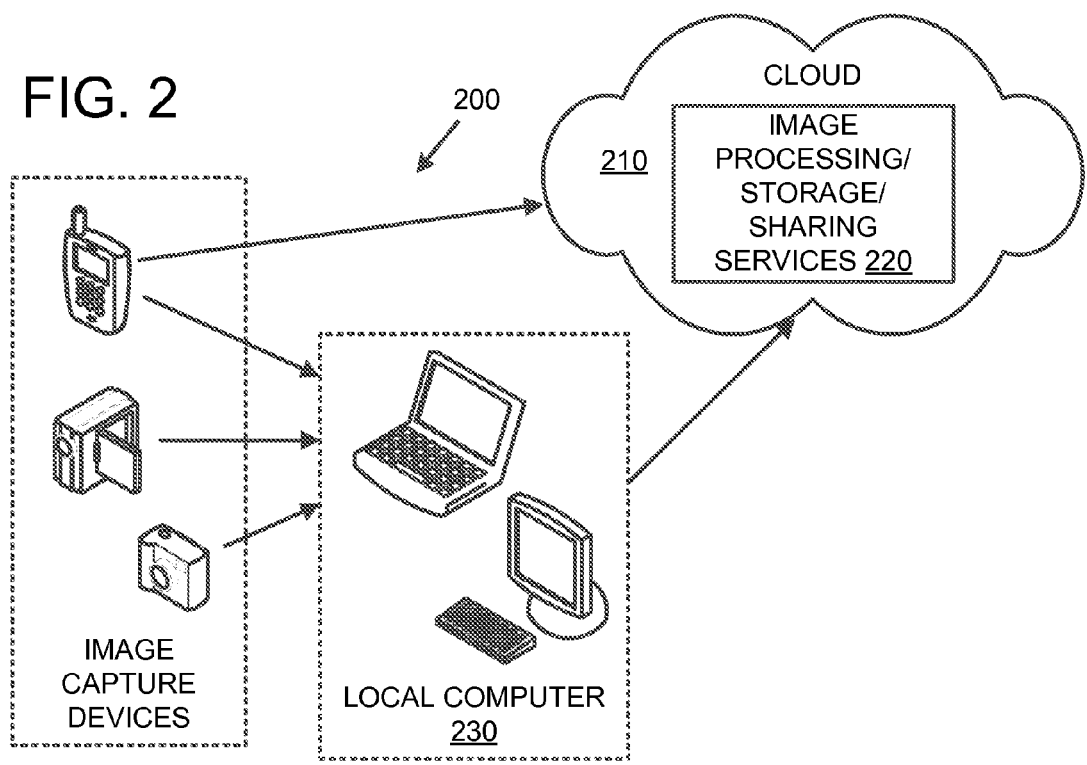
FIGS. 2 and 3 are block diagrams of a cloud computing network environment in which embodiments of the disclosed HDR image generation, rendering, and alignment techniques can be practiced.
Figure 3:
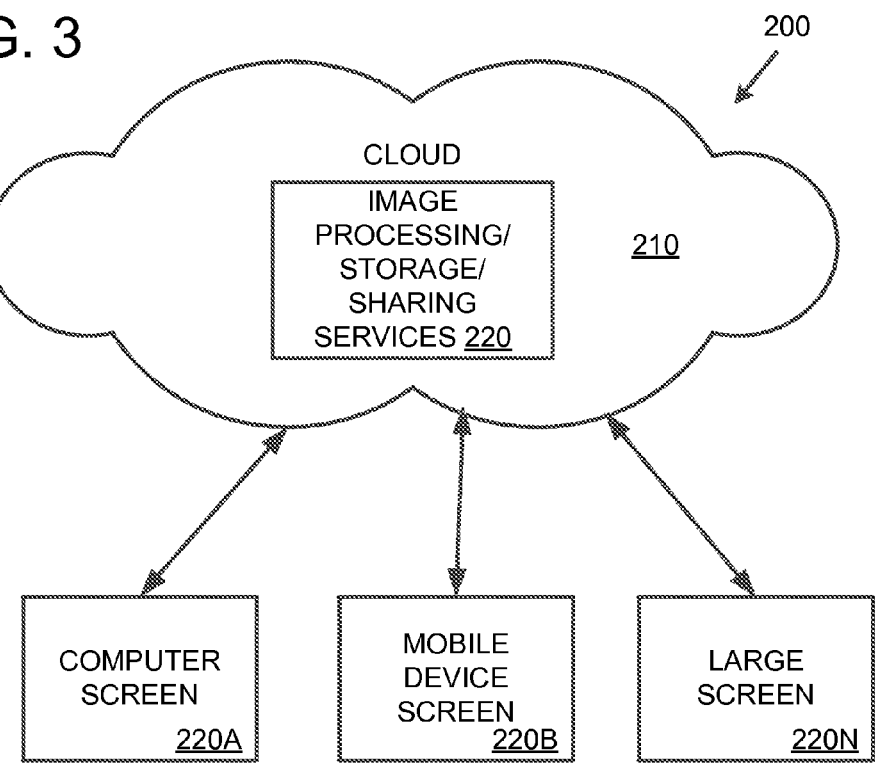

FIGS. 2 and 3 illustrate a generalized example of a suitable networking environment 200 for cloud computing in which the HDR image processing and/or image alignment techniques described herein can be practiced.

In example cloud computing network environment 200, various types of computing services for HDR image sharing, generation, storage or distribution (e.g., image sharing, generation, or social networking sites) are provided by a collection of network-accessible computing and storage resources, referred to as the cloud 210. For example, the cloud 210 can comprise a collection of server computing devices, which may be located centrally or at distributed locations, that provide cloud-based services to various types of users and devices connected via a network, such as the Internet.

In example environment 200, the cloud 210 provides services 220 (such as HDR image storage, HDR image generation, HDR image rendering, image alignment, HDR image sharing, or social networking services, among other examples) for user computing devices. Services can be provided in the cloud 210 through cloud computing service providers, or through other providers of online services. For example, the cloud-based services 220 can include an HDR image generation service, an HDR image rendering service, an image alignment service, an image storage service, an image sharing site, a social networking site, or other services via which user-sourced images are distributed for viewing by others on connected devices 220A-N.

The user may use various image capture devices to capture one or more images (e.g., images at different exposures or HDR images), such as digital cameras, mobile phones, and handheld computing devices. The user can upload the one or more digital images to the service 220 on the cloud 210 either directly (e.g., using a data transmission service of a telecommunications network) or by first transferring the one or more images to a local computer 230, such as a laptop, personal computer or other network connected computing device.

As shown in FIG. 3, one or more digital images (e.g., images having different exposures or HDR images) can be later downloaded or otherwise accessed from cloud based image storage or sharing site to other connected computer devices which may have a variety of screen display size factors 220A-N.

Connected device 220A represents a device with a mid-size display screen, such as may be available on a personal computer, a laptop, a tablet or other like network connected devices. Connected device 220B represents a device with display screen with form factors designed to be highly portable (e.g., a small size screen). For example, connected device 220B could be a mobile phone, smart phone, personal digital assistant, and the like. Connected device 220N represents a connected device with a large viewing screen. For example, connected device 220N could be a television screen (e.g., a smart television) or another device that provides image output to a television or an image projector (e.g., a set-top box or gaming console), or other devices with like image display output.

In the illustrated cloud-computing network environment 200, any of the HDR processing and/or image alignment techniques disclosed herein can be implemented and performed at various stages of the image sharing, storage and distribution, and by various ones of the depicted devices depending on the desired use scenario. In one example scenario, any of the HDR processing and/or image alignment techniques is implemented in software on the local computer 230, and applied when images are either initially transferred to the local computer or when uploaded to the cloud-based service 220. In another scenario, any of the HDR processing and/or image alignment techniques is implemented in the cloud, and applied to images as they are uploaded to and stored in the cloud. In another scenario, any of the HDR processing and/or image alignment techniques is implemented by cloud computing services and applied when the images are accessed, transferred, or distributed to another connected device or service. In still other scenarios, any of the HDR processing and/or image alignment techniques is performed on the connected device after images are downloaded or otherwise accessed from the cloud 210.

III. High Dynamic Range Imaging-Overview

Although the human visual system is capable of detecting details in a very wide dynamic range, especially in terms of brightness, humans do not normally pick up details across the full breadth of this dynamic range all at once. For example, it is difficult for humans to pick up details in very bright areas and very dark areas simultaneously. However, by focusing on various local areas in a scene, the human visual system can adapt very quickly to brightness in local areas in order to see details in bright areas (e.g. sky) as well as darker areas (e.g., shadows).

Many existing digital cameras (including most DSLR (digital single lens reflex) cameras) lack direct HDR image capture capabilities and are only capable of delivering each shot from one single perspective at a standard dynamic range. So, there is a large gap between the level of detail that humans can perceive and the level of detail that can be represented in SDR images. A viable solution to the problem is High-Dynamic-Range (HDR) imaging. An HDR image can capture rich information in a scene, and when rendered properly can deliver a very realistic visual experience. Due to the non-linearity and local-adaptive nature of the human visual system, most of the HDR imaging experience can be achieved with normal printouts or existing displays, making the market for HDR images potentially very large. HDR imaging technologies have therefore drawn more attention recently from users, including professional photographers and hobbyists.

A. Exemplary HDR Image Formats

Digital images described herein can be color, grey-scale, or other types of images, and can be represented in a variety of file formats (e.g., GIF, PNG, BMP, TIFF, TIFF Float32, JP2, HDR, OpenEXR, JPEG XR, Radiance RGBE and/or other formats). This section provides details about some image formats that can be used with described techniques and tools for generating HDR images, rendering HDR images, and/or aligning digital images. For example, described techniques and tools can handle HDR images in a JPEG XR format.

JPEG XR is a flexible and powerful format that is useful for encoding HDR images, supporting up to 32-bit floating point numbers. JPEG XR supports HDR image coding while requiring only integer operations (with no divides) for both compression and decompression. JPEG XR is compatible with a file container to store image data and metadata, which can include HD Photo metadata, XMP metadata, and Exif metadata through IFD tags. Compared to existing HDR formats, such as TIFF Float, OpenEXR, and Radiance RGBE, the JPEG XR format provides much higher compression capability while preserving reasonable image quality. The JPEG XR file format is extensible, so additional metadata (either proprietary or standard) can be inserted in JPEG XR files without changing image bit streams.

Radiance RGBE is another format for carrying HDR image data. In an RGBE image, each pixel is represented by 32 bits: one group of bits (e.g., one byte) for a red mantissa (R), one group of bits (e.g., one byte) for a green mantissa (G), one group of bits (e.g., one byte) for a blue mantissa (B), and the remaining bits (e.g., one byte) for a common exponent (E) that is applied to the values represented by the mantissa for each of the R, G and B channels. In RGBE, effective pixel values (fR, fG, fB) are floating point numbers, where fR=$R*2^{(E-128)}$; fG=$G*2^{(E-128)}$; and fB=$B*2^{(E-128)}$. An RGBE rule restricts the largest 8-bit mantissa within the range [128, 255], while the other two 8-bit mantissas are unrestricted (the range is [0, 255]). So, the mapping from RGB to RGBE is unique. The dynamic range that RGBE can present is [$2^{-127}$, $2^{+127}$], which is approximately 76 orders of magnitude. The RGB value reconstructed from an RGBE pixel is unsigned— all nonzero values are positive. However, since the three color components share the same exponent, the precision of the two smaller components is sacrificed. E=0 is a special case, indicating that the corresponding pixel value is zero.

One variant of Radiance RGBE (9:9:9:5) assigns 9 bits each to the red, green and blue mantissa channels, and 5 bits to the exponent, thus representing each pixel in 32 bits as in the 8:8:8:8 format described above. Other representations of RGBE also are possible, with different numbers of bits assigned to the mantissas and the exponent.

32-bit floating point ("32-bit float") is commonly used in representing floating point image data. Container formats defining 32-bit floating point images include Portable Float Map ("PFM") and Tagged Image File Format ("TIFF"). The IEEE 754 32-bit single-precision float number includes 1 bit for the sign (s), 8 bits for the exponent (e) and 23 bits for the mantissa (m). 16-bit floats (also referred to as "half") have one sign bit, five exponent bits and ten mantissa bits. Since the 16-bit and 32-bit floating point representations are structurally identical except for specific differences in lengths of fields, they can be referred to generically as "floating point."

Some image formats are specified by international standards. For example, the JPEG and JPEG2000 standards set forth requirements for decoders to decode images encoded in JPEG and JPEG2000 format, respectively. A JPEG2000-compliant encoder and decoder ("codec") provides high-quality images with good compression efficiency. The JPEG XR standard was developed from Windows Media Photo and HD Photo, proprietary image compression formats developed by Microsoft Corporation as part of the Windows Media family of technologies. JPEG XR is described in international standard ISO/IEC 29199-2:2009.

The disclosed technology can be adapted and used to generate HDR images in any of the disclosed formats.

IV. High Dynamic Range Image Generation and Rendering

A. Generalized HDR Imaging System

In examples described herein, SDR images are images with 8 bits per color channel (bpc), and HDR images are 16 bpc images, 32 bpc, or more. More generally, "standard dynamic range" or SDR refers to a display, image, or format with a narrower or lower dynamic range than an HDR image. (SDR images also can be referred to as lower dynamic range, or LDR images.) Similarly, "high dynamic range" or HDR refers to a display, image, or format with a wider or higher dynamic range than an SDR image. For example, described embodiments can be used to generate 32 bpc HDR images from 8 bpc SDR images, or for rendering 32 bpc HDR images for display on a 16 bpc or 8 bpc monitor.

In general, digital images described herein can be captured by or stored on any device capable of capturing digital images (e.g., digital still image cameras, digital video cameras, scanners, or multipurpose devices with image capture capability such as camera phones) or any medium capable of storing digital images (e.g., volatile memory or nonvolatile memory).

Figure 4:
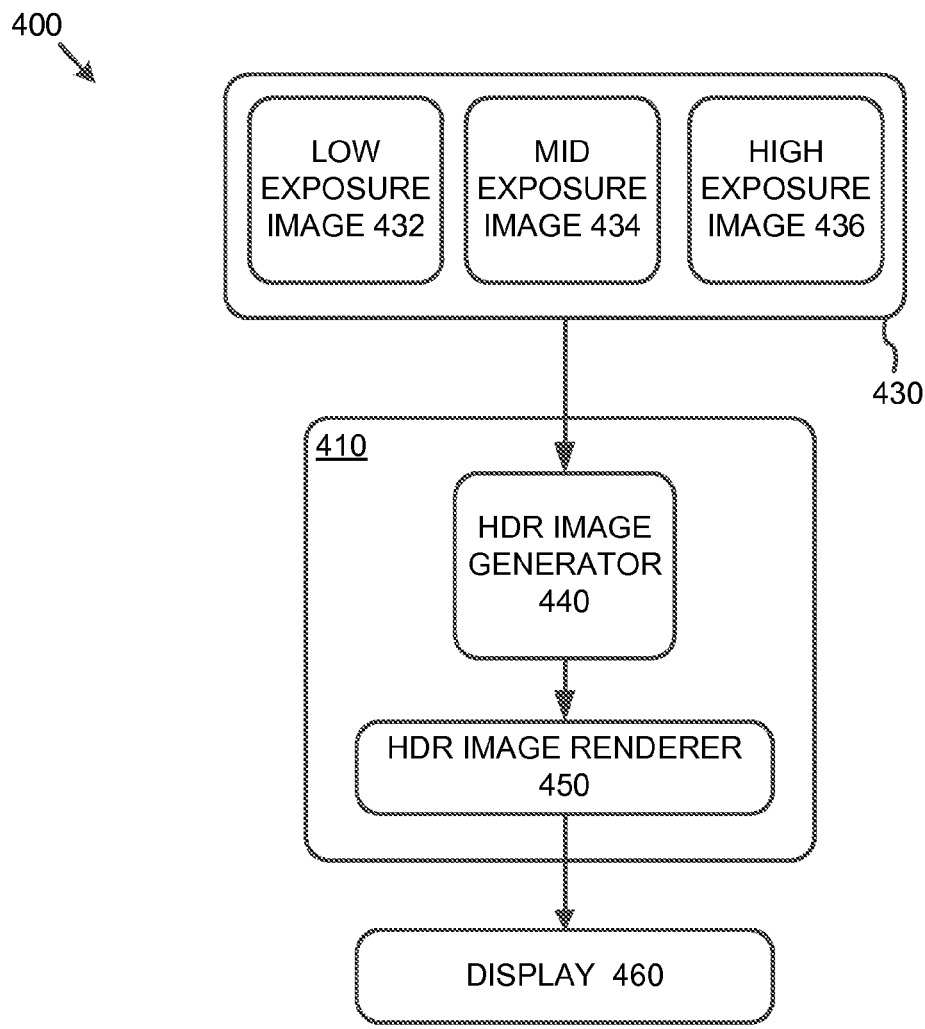
FIG. 4 is a block diagram illustrating a generalized HDR image processing system according to one or more described embodiments.

FIG. 4 is a block diagram 400 illustrating a generalized HDR image processing system 410. The HDR image processing system can be implemented using any of the computing environments disclosed above. FIG. 4 shows a set 430 of non-HDR (e.g., SDR or LDR) images 432, 434, and 436 having lower dynamic ranges and varying exposures being input into the HDR image processing system 410. Furthermore, in FIG. 4, image 432 has a lower exposure than image 434, and image 434 has a lower exposure than 436. Thus, images 432, 434, 436 are sometimes referred to as low exposure image 432, mid exposure image 434, and high exposure image 436. In general, the images input to the system 410 can be a set of two or more images (e.g., a set of two or more LDR images having varying exposures but imaging the same scene) optionally along with other information, such as metadata or user preference data (not shown) relating to the images. Metadata can include, for example, information indicating camera settings. User preference data can include, for example, user-controlled parameter settings for viewing or modifying images. Metadata and user preference data can be contained within image files or provided separately.

FIG. 4 further shows an HDR image generator 440 operable to generate HDR images and an HDR image renderer 450 operable to render HDR images for display. Although the system 410 shows HDR image generator 440 and an HDR image renderer 450, the system 410 can perform HDR image generation without rendering, such as when HDR images are generated for storage or for further processing, but are not displayed.

In the example shown in FIG. 4, HDR image generator 440 synthesizes information from the image set 430 (e.g., images of the same scene taken at slightly different time instances, each with a different exposure setting). In certain embodiments, the HDR image generator 440 uses the method disclosed below with respect to FIG. 6 to generate an HDR image. HDR image renderer 450 can then map a generated HDR image to an SDR image and prepare the SDR image for output on display 460. In certain embodiments, the HDR image renderer 450 uses the method disclosed below with respect to FIG. 7 to render an HDR image. It is also possible to render HDR images without remapping to a standard dynamic range, such as when a display is capable of displaying an HDR image in its full dynamic range without remapping.

The relationships shown between modules within the system 410 indicate general flows of information in the system; other relationships are not shown for the sake of simplicity. Particular embodiments typically use a variation or supplemented version of the generalized system 410. Depending on the implementation and the type of processing desired, modules of the system can be added, omitted, split into multiple modules, combined with other modules, and/or replaced with like modules. In alternative embodiments, systems with additional or different modules and/or other configurations of modules perform one or more of the described techniques. For example, the system 410 can include a pre-processor that smoothes input digital images using a lowpass filter or other filter so as to selectively remove high-frequency components. Or, the pre-processor performs other pre-processing tasks.

The system 410 can also include one or more encoders that compress image data, outputting a bit stream of compressed digital image information. The exact operations performed by the encoder can vary depending on the compression format. For example, an encoder can compress the HDR image information according to an HDR image format, such as JPEG XR, or an encoder can compress SDR image information according to a format, such as JPEG. The system 410 also can include one or more decoders that decompress compressed image data, outputting a bit stream of decompressed digital image information. The exact operations performed by the decoder can vary depending on the compression format. For example, a JPEG XR-compliant decoder can decompress HDR image information in a JPEG XR file, or a JPEG-compliant decoder can decompress SDR image information in a JPEG file.

B. Generalized HDR Generation and Rendering

Figure 5:
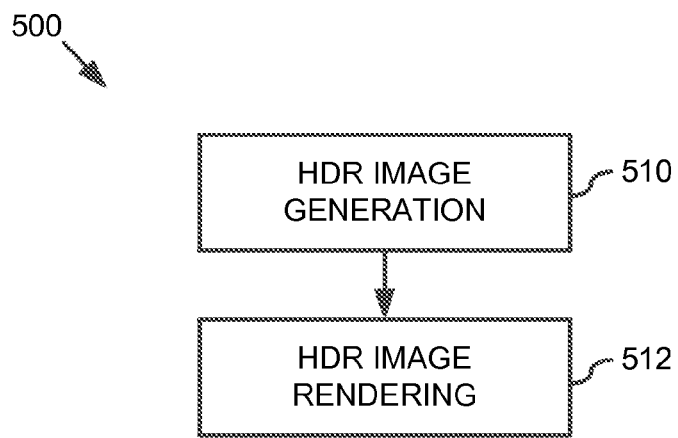
FIG. 5 is a flow chart showing an exemplary HDR imaging workflow including HDR image generation and HDR image rendering according to one or more described embodiments.

FIG. 5 is a flow chart 500 of an exemplary generalized digital HDR imaging method that includes HDR image generation 510 and HDR image rendering 520. The method can be performed, for example, by the HDR image processing system 410 shown in FIG. 4 or other system. HDR image generation 510, an HDR image is generated. For example, an HDR image can be generated by synthesizing information from multiple SDR images (e.g., images of the same scene taken at slightly different time instances, each with a different exposure setting). In certain embodiments, HDR image generation 510 is performed using the method disclosed below with respect to FIG. 6. It is also possible to generate HDR images directly without combining multiple images, such as by capturing an image with an image capture device that is capable of capturing original images with HDR bit depth. HDR image generation 510 can include preprocessing (e.g., manual or automatic operations) to remove undesirable image artifacts (e.g., artifacts introduced when compressing source images that will be used to form an HDR image).

In HDR image rendering 520, HDR image information is converted into another form. For example, an HDR image can be rendered as an SDR image (e.g., a JPEG image) and displayed on an SDR display. In certain embodiments, HDR image rendering 520 is performed using the method disclosed below with respect to FIG. 7. Image rendering can involve a tone mapping process (e.g., an automatic or semi-automatic tone mapping process). Rendered images can be published or archived. However, image data is typically lost when converting HDR images to SDR images. Therefore, it can be useful to archive an original version of the HDR image (e.g., to perform further modifications on the original image at a later stage). It is also possible to render HDR images without remapping to a standard dynamic range, such as when a display is capable of rendering the full dynamic range of an HDR image without remapping.

Although the exemplary flow chart 500 shows HDR image generation 510 followed by HDR image rendering 520, an HDR image processing system can generate HDR images without rendering them, such as when HDR images are generated for storage or for further processing, but are not displayed. An HDR image processing system also can render HDR images rendering without generating them, such as when the HDR image processing system obtains HDR image information (e.g., via a communication medium) from some other source without first generating the HDR image.

C. Exemplary Methods for High Dynamic Range Image Generation

Figure 6:
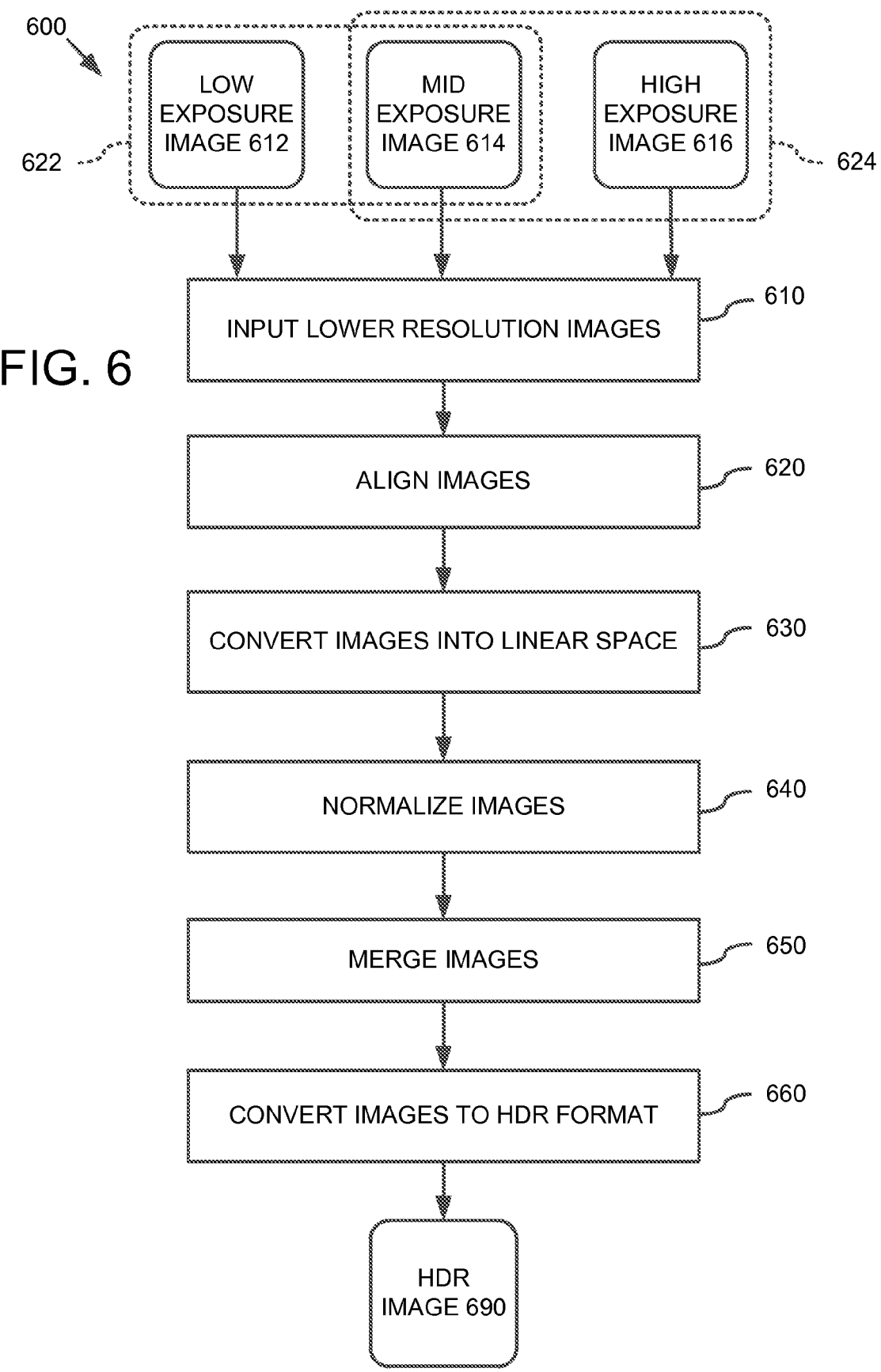
FIG. 6 is a flow chart showing an example technique for generating an HDR image from a set of SDR images, according to one or more described embodiments.

FIG. 6 is a flow chart illustrating an exemplary method 600 of performing HDR image generation. A system such as the HDR image processing system 410 shown in FIG. 4 or other system performs the method 600. The illustrated method should not be construed as limiting, however, as any one or more of the illustrated acts can be performed alone or in various combinations and subcombinations with one another or with other HDR image generation processes.

At 610, LDR image information is input. In the illustrated embodiment, the set of LDR images comprises low exposure image 612, mid exposure image 614, high exposure image 616, which are images of a scene with one or more different exposure settings that will produce a higher dynamic range image 690 when the images are processed and integrated. For example, LDR images 612, 614, 616, are images of a scene taken at different time instances with different exposure settings.

At 620, image alignment is performed. For example, when SDR images 612, 614, 616 represent the visual state of a scene at different time instances, motion that occurs in the sequence of images is analyzed at 620 and the images are aligned so as to allow the images to be merged in order to form an HDR image. When images of an object or scene are taken at different time instances, there is very likely to be image motion (typically, rotational, translational, or zooming) between the different shots of the object or scene. The image alignment performed at 620 is performed in order to quantify the movement so that such movement can be considered when performing further processing.

An exemplary method for performing image alignment is discussed in detail below with reference to FIGS. 8-15. As more fully explained below with reference to FIGS. 8-15, in certain embodiments of the disclosed technology, a mid exposure image is used as a reference image. In such embodiments, a low exposure image is aligned with the reference mid exposure image (shown at 622) and a high exposure image is separately aligned with the reference mid exposure image (shown at 624). The reference image is typically an image with a mid exposure range (an exposure setting or range that is not the brightest or the darkest in the set of input images), though images at other exposure levels can also be used as a reference image. In one implementation, the reference image is selected based on which image in a set of input images has the most pixel sample values within a certain range (referred to as the "middle" or "normal" range). The limits of the normal exposure range, and the way in which the normal range is determined, can vary. For example, a normal exposure range can be predetermined for all images, or determined adaptively for each image or input image set (e.g., based on image information and/or user preferences). Selection of a reference image can be performed automatically (e.g., based on image information and/or user preference information), or an image can be designated (e.g., via a user) as a reference image.

In particular embodiments, global motion analysis is performed as part of the image alignment process. For instance, the global motion analysis method discussed below with respect to FIGS. 8-15 is performed once for the low exposure image and mid exposure image, resulting in a global motion transform that aligns the low exposure image with the mid exposure image, and once for the high exposure image and mid exposure image, resulting in a global motion transform that aligns the high exposure image with the mid exposure image.

Global motion analysis generally refers to analysis that aims to model motion such as panning, shudder, rotation, zoom, or other movements that affect the entire image. Global motion analysis can involve looking for matching pixel sample values in pixel locations or groups of pixel locations (e.g., blocks) that are consistent with particular kinds of global motion. For example, looking for panning motion in a non-reference image can involve searching for matching pixel sample values (or groups of pixel sample values, such as blocks) in a predominantly horizontal direction in a reference image. Local motion analysis refers to analysis that aims to model movement in individual parts of the image, such as movement of objects or human subjects.

After detecting motion from a particular pixel location (or group of pixel locations, such as a block) to another, the image alignment process involves quantifying the motion. In particular implementations, motion vectors are computed for pixel samples or groups of pixels (e.g., blocks) in an image, relative to a reference image. For example, a motion vector can indicate a displacement in the horizontal dimension and a displacement in the vertical dimension, relative to a reference image. A motion vector of zero can be used to indicate that no motion has been detected for a particular pixel or group of pixels (e.g., a block).

In example implementations, unusually low pixel sample values or unusually high pixel sample values are not considered in the motion analysis because they are often not reliable;

for example, the high or low value of the pixel sample value may be due to image noise, or the value may not be an accurate measurement due to dynamic range limitations of an image sensor in the image capture device. The range of acceptable pixel sample values for use in motion analysis, and the way in which the range is determined, can vary. For example, a range of acceptable pixel sample values for use in motion analysis can be predetermined for all images, or determined adaptively for each image or input image set (e.g., based on image information and/or user preferences).

At 630, the images are converted into a linear space. The images 612, 614, 616 are typically in a non-linear space (e.g., RGB), and there is no reliable way to merge them. In some embodiments, the images are converted into a linear space (e.g., into a linear radiance space) using the ICC profile of each image. For example, a gamma-to-linear converter can be used to convert input image signals that are not in a linear domain into a linear domain. Data in still image files (e.g., JPEG files) typically include gamma-encoded values. Thus, in one implementation, RGB samples are converted to the linear domain according to a color profile (e.g., an ICC profile) carried in each image.

At 640, the images are normalized. For example, in certain embodiments, the images are normalized (or scaled) based on their relative exposure levels. In general, normalization involves increasing the pixel sample values of the low exposure image and decreasing the pixel sample values of the high exposure image in order to prevent the high exposure image from dominating the final computations involved in HDR image generation. In certain embodiments, the pixel sample values of the non-reference images (e.g., the pixel sample values of the low exposure image 612 and the high exposure image 616 are multiplied or divided by a scaling factor that corresponds to the relative exposure level for the respective image). In such embodiments, the scaling factor transforms the pixel sample value to a level normalized with the reference image (e.g., the mid exposure image 614). In some embodiments, the scaling operations are applied to the linear data output from method act 630, with the same scaling factor applied across R, G and B pixel sample values of an image. Alternatively, scaling is performed before image alignment, and the motion analysis associated with the image alignment is performed on the scaled pictures. In certain implementations, two normalization ratios (or scaling factors) are computed, a first normalization ratio for normalizing the low exposure image 612 to the mid exposure image 614 and a second normalization ratio for normalizing the high exposure image 616 to the mid exposure image 614. In one particular implementation, the first ratio (ratioLow) is computed by dividing the average mid exposure image pixel sample values (e.g., the average of all R, G, and B values for the mid exposure image) by the average low exposure image pixel sample values (e.g., the average of all R, C, and B values for the low exposure image)). Thus, ratioLow=average(mid exposure)/average(low exposure). Similarly, the second ratio (ratioHigh) is computed by dividing the average mid exposure image pixel sample values (e.g., the average of all R, G, and B values for the mid exposure image) by the average high exposure image pixel sample values (e.g., the average of all R, G, and B values for the high exposure image). Thus, ratioHigh=average(mid exposure)/average(high exposure)). To complete the image normalization process, the RGB pixel sample values of the linear space low exposure image are multiplied by the ratioLow value, and the RGB pixel sample values of the linear space high exposure image are multiplied by the ratioHigh value (which is typically less than 1, and thus can be computationally performed as a division). Although the exemplary embodiment averages R, G, and B values together, alternative embodiments compute different averages for each of the R, G, and B values, resulting in multiple scaling factors.

At 650, the images are merged. In particular, when the images 612, 614, 616 are input, there are multiple sample values for each pixel position in the image. Thus, at 650, single pixel sample values (e.g., a single R pixel sample value, a single G pixel sample value, and a single G pixel sample value) are computed for pixel positions in the HDR image from the multiple pixel sample values at corresponding positions in the images 612, 614, 616. The pixel sample values used during the merging process at 650 can be the pixel sample values of the images 612, 614, 616 after alignment (e.g., after applying the global motion transform computed at 620) and after the pixel values are converted into linear space and normalized (e.g., at 630 and 640).

In one implementation, a weighted average of the pixel sample values is computed for each pixel position (e.g. a weighted arithmetic mean). The weighting factor applied to the pixel sample values in the weighted average (e.g., the weighting factor applied to the pixel sample value of the low exposure image at the pixel position under consideration, the weighting factor applied to the pixel sample value of the mid exposure image at the pixel position under consideration, and the weighting factor applied to the pixel sample value of the high exposure image at the pixel position under consideration) is based on whether the original pixel value before linear conversation and normalization is reliable, In general, the weighting factor is proportional to the confidence level that the pixel value is reliable: the higher the confidence level, the higher the weighting factor, For example, pixel sample values with relatively high values (e.g., over 240) in the high exposure image are typically unreliable, as are pixel sample values with relatively low values (e.g., under 15) in the low exposure image. Such values correspond to areas of the image that are dark or saturated.

The weight applied to a particular pixel sample value can be determined using a variety of techniques but in certain embodiments is computed using a hat function. An example of a suitable hat function is shown in Table 1, The example hat function in Table 1 produces a weighting factor (wt_lut8) that is dependent on the input pixel value (i). The hat function shown in Table 1 produces weighting factors that help ensure that pixels with very low and very high values are considered as unreliable, and thus contribute less to the final image pixel sample value. It should be understood that the variables and behavior of the exemplary hat function should not be construed as limiting but can vary from implementation to implementation.

TABLE 1

An Example Function for Determining Weight of Pixel Sample Values

```
A hat function: float wt_lut8[256];
  for(int i=0; i<256; i++){
    wt_lut8[i]=1-powf(((2*i/256.0f)-1.0f), 12.0f);
  }
```

Before the weighted average at a HDR pixel position is computed, the converted and normalized pixel sample values of the images 612, 614, 616 can also be corrected for possible gamma correction quantization errors. An example of a suitable gamma quantization error function is shown in Table 2. The example gamma quantization error function computes a gamma error (gm_error) that is dependent on the input pixel value (i). It should be understood that the variables of the exemplary gamma quantization error function should not be construed as limiting and can vary from implementation to implementation.

TABLE 2

An Example Function for Gamma Error Correction

```
for(int i=1; i<256; i++){
    gm_error[i] = powf((float)(i+.5f)/255, 2.2f) − powf((float)(i−.5f)/255,
    2.2f)
}
```

At 660, the merged image is converted to an appropriate HDR format. For example, the merged pixel data from process block 650 can be encoded into an RGBE or JPEG XR image file. The merged pixel data can be encoded into other formats as well, such as a "half float" file or another file suitable for representing HDR image data. In certain embodiments, conversion into an HDR format is not performed, such as when raw HDR pixel data is the desired output, and no special formatting or encoding is necessary.

The method of FIG. 6 can be modified in a variety of different manners to provide additional or alternative features. For example, in certain embodiments, the input images 612, 614, 616 can be pre-processed (e.g., prior to process block 620). The pre-processing can include applying low-pass filter or other filter so as to selectively remove high-frequency components. Or, the pre-processing can include applying filters (e.g., smoothing filters) to remove image artifacts, such as block artifacts, banding artifacts, ringing artifacts, or artifacts resulting from demosaicing operations in an image capture device.

D. Exemplary Methods for High Dynamic Range Image Rendering

Figure 7:
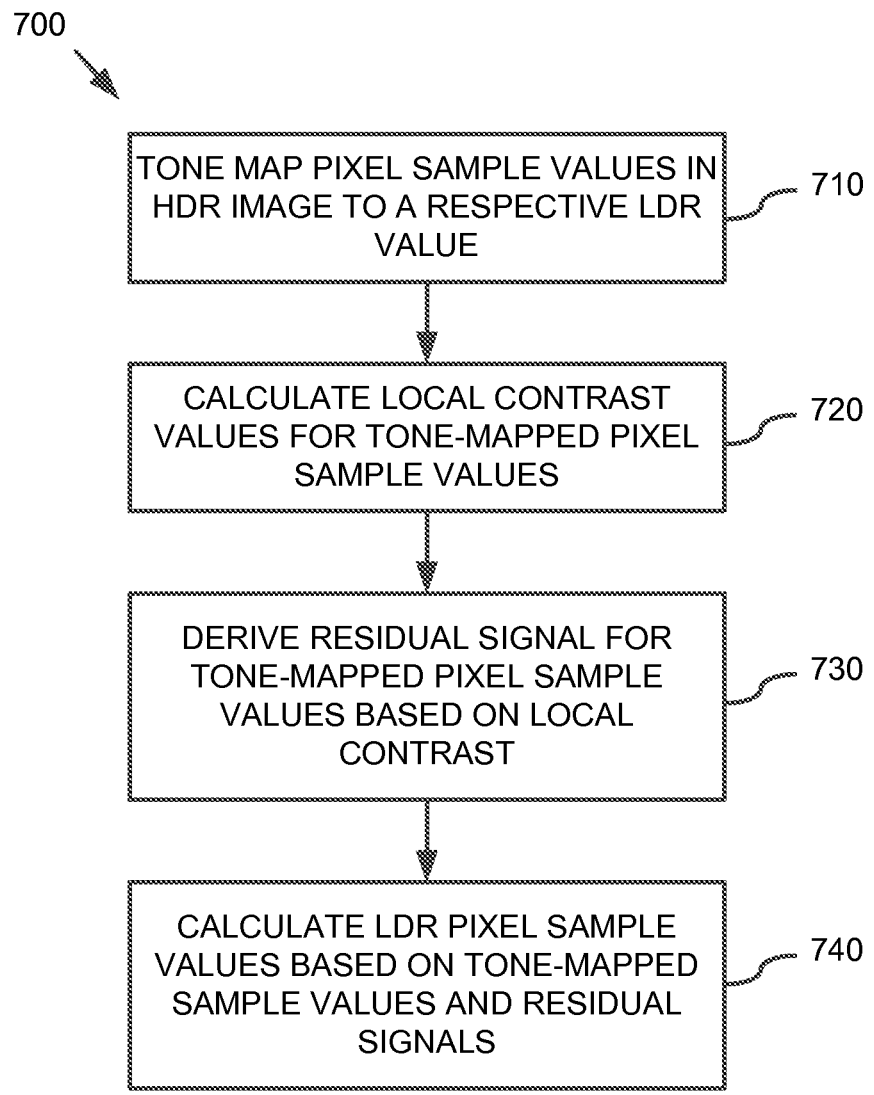
FIG. 7 is flow chart showing an example technique for rendering an HDR image, according to one or more described embodiments.

FIG. 7 is a flow chart illustrating an exemplary method 700 for performing HDR image rendering. A system such as the HDR image processing system 410 shown in FIG. 4 or other system can perform the method 700. As used herein, the term "rendering" refers to converting HDR image data to a different form. Examples of applications for rendering HDR image data include preparing an HDR image for display on a monitor having a lower dynamic range, or converting HDR image data in an HDR image file for storage in an SDR image file. The illustrated method should not be construed as limiting, however, as any one or more of the illustrated acts can be performed alone or in various combinations and subcombinations with one another or other HDR image rendering processes.

At 710, pixel sample values in an HDR digital image are tone mapped to respective lower dynamic range values. Tone mapping can be performed using a global tone map or a global tone map and one or more local tone maps. In general, a tone map refers to a function, g, which maps an image pixel sample value s to a pixel sample value g(s). Global tone mapping is the process of applying a global tone map to each of the pixel sample values in a given image I. For example, a global tone map can be applied to an image to modify the brightness and/or contrast qualities of the image as desired by a user, resulting in a tone-mapped image G(I). Local tone mapping refers to a function L which transforms an image I to a tone-mapped image L(I). As with global tone mapping, a local tone map can be applied to an image with the goal of adjusting brightness and contrast in the image. However, a local tone map can allow for local adjustments which may not be uniformly applied across the image. In certain embodiments, respective LDR values can be identified in a global or local tone mapping lookup table and stored in an LDR image buffer.

At 720, a local contrast value is computed for each of the tone-mapped pixel sample values. For example, a local contrast value is computed based on image data in the linear domain.

At 730, a residual signal is derived for each of the tone-mapped pixel sample values, based at least in part on the respective local contrast value. For example, the system multiplies a pixel sample value in the LDR image buffer by the corresponding local contrast value.

At 740, pixel sample values are computed for an LDR digital image based at least in part on the tone-mapped sample values and the respective residual signals. For example, the system adds together a sample value in the LDR buffer, the corresponding residual signal and a high-frequency dithering signal.

V. Image Alignment Techniques for Use in High Dynamic Range Image Generation

A. Exemplary Generalized Alignment Methods

Figure 8:
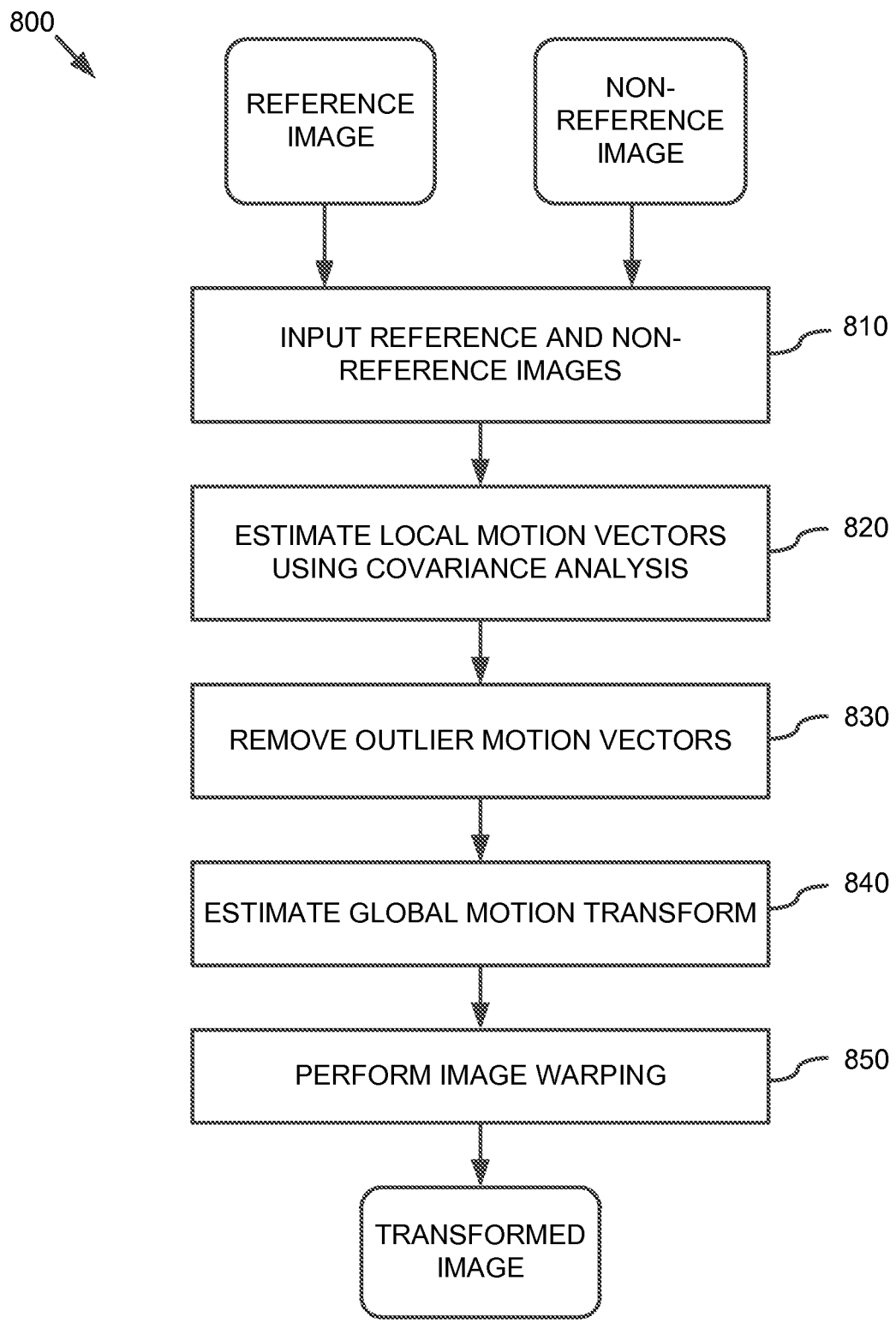
FIG. 8 is a flow chart showing an example image alignment technique as can be used with the embodiment of FIG. 6.

FIG. 8 is a flow chart 800 illustrating an exemplary digital image alignment technique. The illustrated technique can be used at, for example, process block 620 of FIG. 6 above. The illustrated method should not be construed as limiting, however, as any one or more of the illustrated acts can be performed alone or in various combinations and subcombinations with one another or other HDR image processing acts.

At 810, a reference image and a non-reference image (the image to be aligned) are input (e.g., loaded, buffered into memory, or otherwise accessed or prepared for further processing). In certain embodiments, the reference image is a mid exposure image and the image to be aligned is either a low exposure image or a high exposure image. For instance, in one particular embodiment, the method 800 is performed once to align a low exposure image to the reference mid exposure image, and once to align a high exposure image to the reference mid exposure image. The order in which the method 800 is performed for the low and high exposure images can vary.

At 820, local motion estimation is performed. For example, and as more fully explained below, a pyramid block-based based motion vector estimation procedure using covariance.

At 830, outlier motion vectors are removed. For example, and as more fully explained below, a Random Sample Consensus ("RANSAC") method can be used to detect and eliminate motion vectors that are outliers due to moving objects with local motions, saturation, and/or under exposure.

At 840, a global motion transform is estimated. For example, a global motion vector can be estimated by processing the motion vectors computed at process block 820 and can be used to compensate for translation, rotation, and/or zooming of the image to be aligned (e.g., as a result of jitter from hand shakiness).

At 850, image warping is performed to the non-reference image (the image to be aligned). For instance, when the low exposure image is the image to be aligned, the low exposure image can be warped, and when the high exposure image is the image to be aligned, the high exposure image can be warped.

The local motion estimation 820 and image warping 850 processes are typically computationally intensive, and are desirably performed using available multimedia DSP components on the target computing device (e.g., using a specialized ASIC unit (such as the Tesla GPU from Nvidia, or the Larabee unit from Intel), a graphics processing unit ("GPU") with shader capability, or a multi-core processor or central processing unit having advanced multimedia instructions (e.g., SSEx instructions)). For example, a form of the local motion estimation 820 that is particularly suited for processing utilizing GPU shaders can be implemented and used to accomplish the local motion estimation portion of the digital image alignment method 800 when the target computing device has a GPU shader capability among its available multimedia DPS components. The global alignment program can also include functionality to perform image warping using a D3D API call with bilinear interpolation when the evaluated target computing device is determined to possess that capability among its available multimedia DSP components. The global transform estimation performed at 840 can be performed by specialized hardware but is typically performed by a CPU.

B. Pyramid Block-Based Motion Vector Estimation Using Covariance

In one example implementation, the local motion estimation (e.g., the local motion estimation at process block 830) is performed using a pyramid block-based motion estimation technique with covariance analysis, as illustrated in FIGS. 9-13. The illustrated technique is particularly well-suited for processing in a GPU shader (if determined to be available on the target computing device). As compared to individually estimating local motion for blocks of the full resolution digital image, the pyramid block-based motion estimation technique also emphasizes global motion of the digital image, which is well suited to estimating overall global motion between two digital images.

The pyramid block-based motion estimation performs motion estimation between the reference image and the non-reference image to be aligned (e.g., between a mid exposure image (the reference image) and a low exposure image (the image to be aligned) or between a mid exposure image (the reference image) and a high exposure image (the image to be aligned)). For the motion estimation, the two images are divided into a regular grid of blocks, such as 16×16 blocks, and the motion estimation calculates a motion vector or displacement of each block of the image to be aligned relative to closely matching image content in the reference image.

Figure 9:
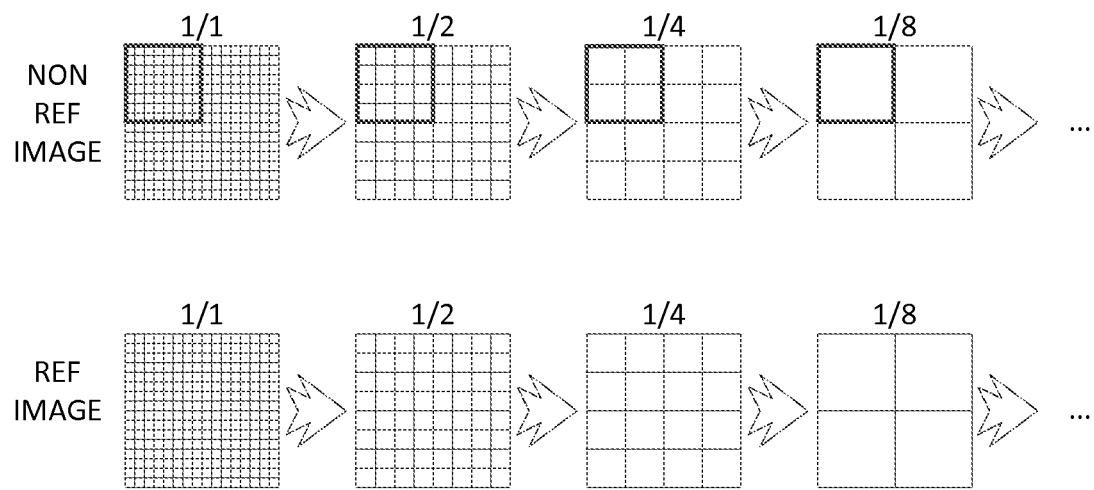
FIGS. 9-13 are diagrams illustrating a pyramid block-based local motion estimation technique as can be used with the image alignment technique of FIG. 8.

The pyramid block-based motion estimation begins by repeatedly down-sampling the resolution of both the non-reference image and the reference image by half (e.g., using a downsampling shader on the GPU of the computing device). In the example shown in FIG. 9, the non-reference image to be aligned and the reference image are downsampled by half three times over to produce versions of the non-reference image and the reference image at full resolution, half-resolution, quarter-resolution, and eighth-resolution. The non-reference image to be aligned and the reference image can be downsampled in resolution a fixed number of times, or can be downsampled a variable number of times dependent on the size and original resolution of the images and/or according to available image buffer space and processing resources of the computing device. Alternatively, the non-reference image and the reference image can be downsampled fewer or more times than the example shown in FIG. 9. It should be understood that the example illustrated in FIG. 9 is illustrative only, and actual digital images processed by the disclosed alignment method would have a larger number of pixels and higher original resolution than illustrated.

For each resolution of the digital image, the pyramid block-based motion estimation divides the digital images into a grid of blocks. The same size of block is used at each resolution. Preferably a relatively large block size, such as 16×16 or 8×8 pixels is used. In this way, each block of the lowest resolution image will split into 4 blocks of the same block size at the corresponding location in the next higher resolution image, which effectively provides a pyramid structure, or hierarchy, relationship of blocks in the lowest resolution image to those at the corresponding location in the higher resolution images. For purposes of illustration, the blocks in the higher resolution versions of the digital image (e.g., 1/1, 1/2 and 1/4 resolution) that are in a pyramid structure relationship to the upper-left block of the 1/8 resolution image are shown within the thick line boundary in FIG. 9.

Figure 10:
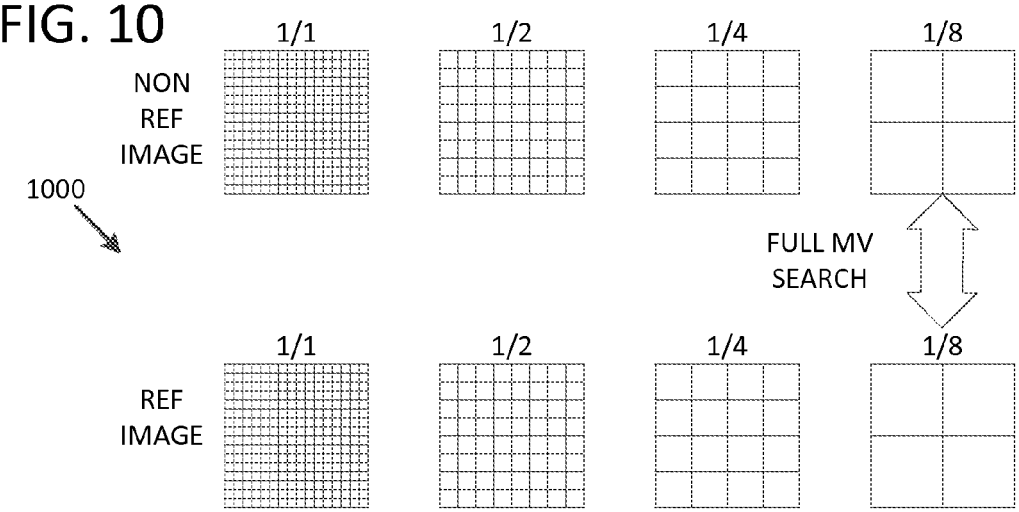

Next, the pyramid block-based motion estimation performs a full motion vector search based on a covariance analysis on each block in the lowest resolution image over the full reference image to find a position of best matching (or nearest matching) image content in the reference image. The search can be performed, for example, by searching for matching blocks at nearby block locations (e.g. using a covariance analysis), then gradually expanding the search area (e.g., using an expanding spiral pattern) to match a block in the image to be aligned with a block in the reference image. The motion vector typically indicates a displacement in the horizontal dimension and a displacement in the vertical direction of the block in the image to be aligned relative to the reference image. A motion vector of zero can be used to indicate that no motion has been detected for a particular block. This process produces a local motion vector for each block in the lowest resolution version of the image to be aligned corresponding relative to the matching (or nearest matching) image content in the reference image. In particular embodiments, the full search is performed only between the lowest resolution version of the image and the lowest resolution version of the reference image, as shown in FIG. 10.

As noted, in certain embodiments of the disclosed technology, a covariance analysis is used to determine the motion vector in the non-reference image to be aligned that best indicates the relative displacement from the matching image content in the reference image (or vice versa). This covariance computation is in contrast to a sum of differences computation. Looking only at the differences between pixel sample values of two images having different exposures is not an effective mechanism for matching image content between images having different exposure levels because the exposure-level differences inherently cause the images to have different pixel values (even if the images are perfectly aligned). A covariance analysis is desirable because covariance measures how much two sets of values change together, regardless of the relative size of the values in the sets. Thus, covariance is effective at detecting and correlating textures and edges between two blocks of image content. Covariance is therefore a useful tool in matching blocks between images having different exposure levels. For instance, in one embodiment, covariances between pixel sample values in a block of the reference image and candidate blocks in the non-reference image to be aligned are computed (or vice versa such that covariances between pixel sample values in a block of the non-reference and candidate blocks in the reference image are computed). The block in the non-reference image having the highest covariance value is then selected as the matching (or nearest matching) block and the corresponding motion vector is computed and used.

In one example, the covariance between two blocks (e.g., a block in the reference image and a candidate block in the non-reference image to be aligned, or vice versa) is computed as follows:

$$cov(X,Y) = \langle (X-\mu_X)(Y-\mu_Y) \rangle \qquad (1)$$

where X is a variate corresponding to pixel sample values from a first block (e.g., the block in the reference image), and Y is a variate corresponding to pixel sample values from a second block (e.g., the candidate block in the image to be aligned). Further, $\mu_X = \langle X \rangle$ and $\mu_Y = \langle Y \rangle$ and are the respective means for x and y. Equation (1) can be more explicitly written as:

$$\text{cov}(X, Y) = \sum_{i=1}^{N} \frac{(x_i - \bar{x})(y_i - \bar{y})}{N} \quad (2)$$

where i is an index value, N is the sample size and corresponds to the number of pixel sample values in the block used as part of the covariance computation, $\bar{x}$ is the mean of the pixel sample values in the first block, and $\bar{y}$ is the mean of the pixel sample values in the second block. In certain embodiments, separate covariance values are computed for the R, G, and B sample values between the two blocks. The separate covariance values can then be averaged or otherwise used to arrive at a single covariance value (e.g., a weighted average can be used). For example, separate covariance computations between the R, G, and B sample values of 16×16 blocks can be performed, in which case N=256. In other embodiments, a single covariance value is computed that accounts for all or a subset of the R, G, and B sample values between the two blocks. For example, a covariance computation between all of the R, G, and B sample values in 16×16 blocks can be performed, in which case N=256(3)=768)

Figure 11:
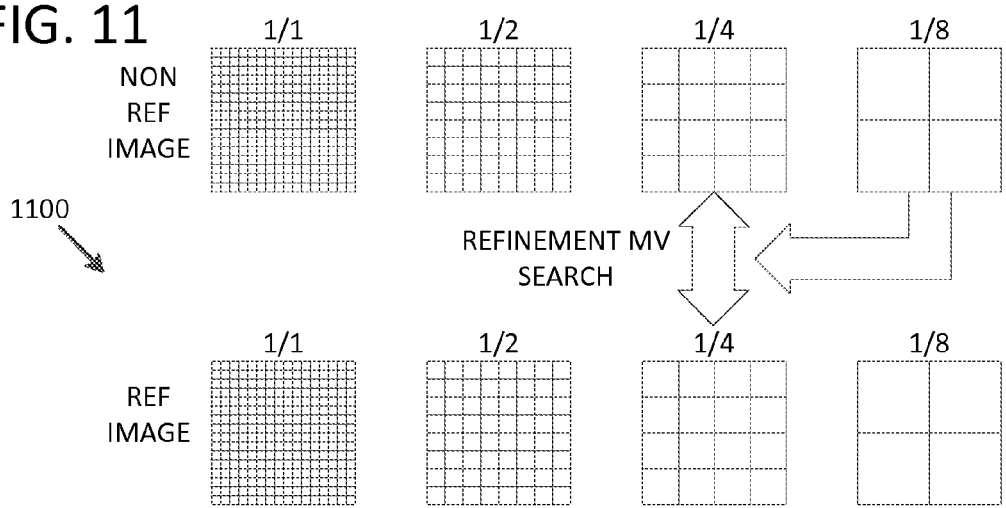
Figure 12:
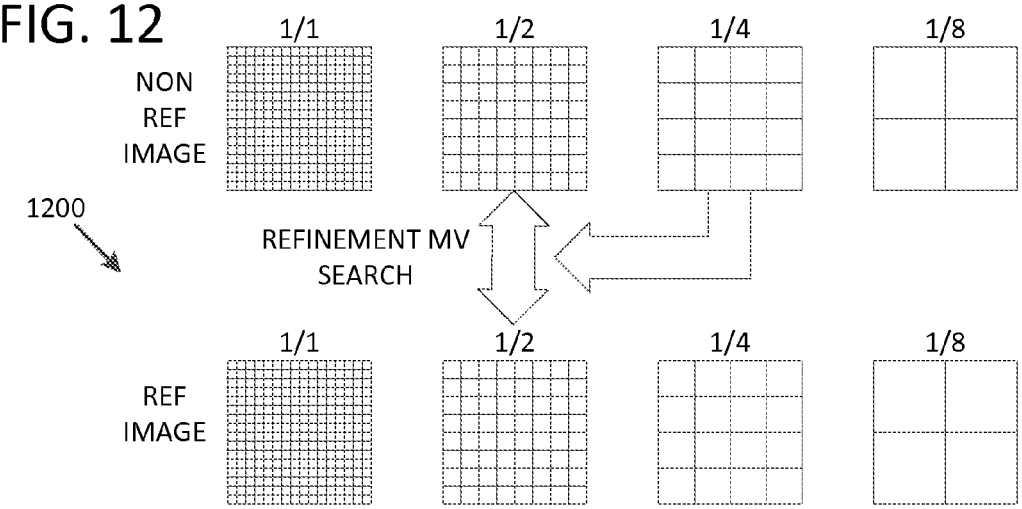
Figure 13:
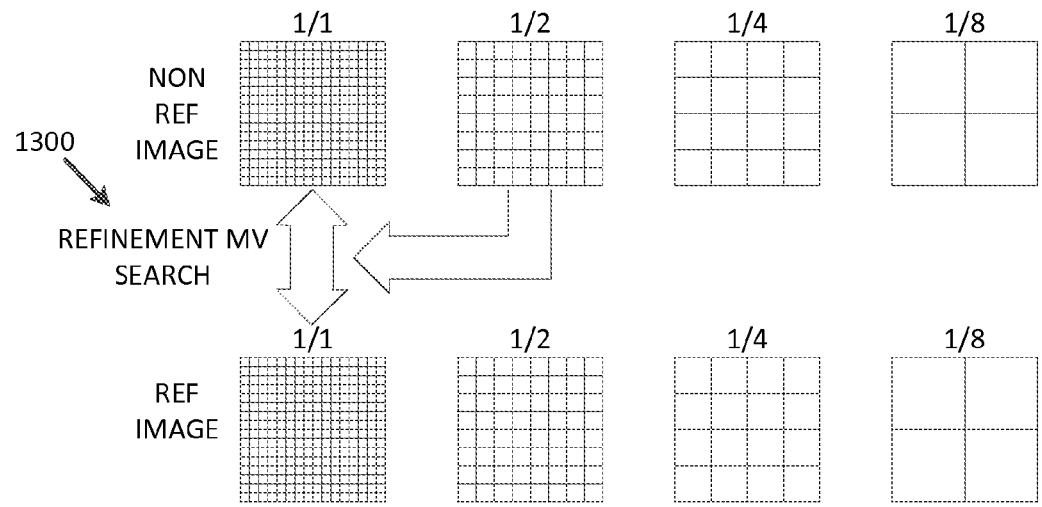

As illustrated in FIGS. 11-13, the pyramid block-based motion estimation using covariance then performs refinement motion estimation searching at each successive higher resolution version of the digital image relative to the reference digital image up to the original resolution of the digital images. As previously mentioned, each block of a lower resolution image splits into four blocks at the corresponding location of the next higher resolution version of the digital image. The motion vector calculated via the motion estimation search for the block in the lower resolution image is used as the starting point of refinement motion estimation searches for each of the four blocks in the pyramid structure at the next higher resolution version of the digital image. This refinement search can also use a covariance analysis to determine the block with the nearest matching image content. In certain embodiments, the refinement search computes the covariance between a reference image block and the block in the non-reference image to be aligned identified by the motion vector from the lower resolution images and also computes the covariances between the reference image block and neighboring candidate blocks of the non-reference image. The refinement search can terminate if none of the neighboring blocks produces a higher covariance value. If one of the neighboring blocks produces a higher covariance value, it can be selected as the matching block, and the refinement search can be continued considering the neighboring blocks of the newly selected block.

The pyramid structure relationship of the blocks in the lower resolution digital image to the four corresponding blocks in the next higher resolution digital image emphasizes consistency in the motion estimation calculation among neighboring blocks. As the refinement search is repeated for each successive higher resolution version of the digital image, this emphasized consistency among neighbors provides a more consistent set of local motion vectors for the blocks in the original resolution image upon which to base the global motion transform estimation discussed below.

Once local motion estimation is finished at the original image resolution, the motion vector (optionally along with the covariance result) for each block of the original resolution image is copied, buffered, or otherwise stored for use in global motion estimation.

C. Global Transform Estimation and Removal of Outlying Motion Vectors

Figure 14:
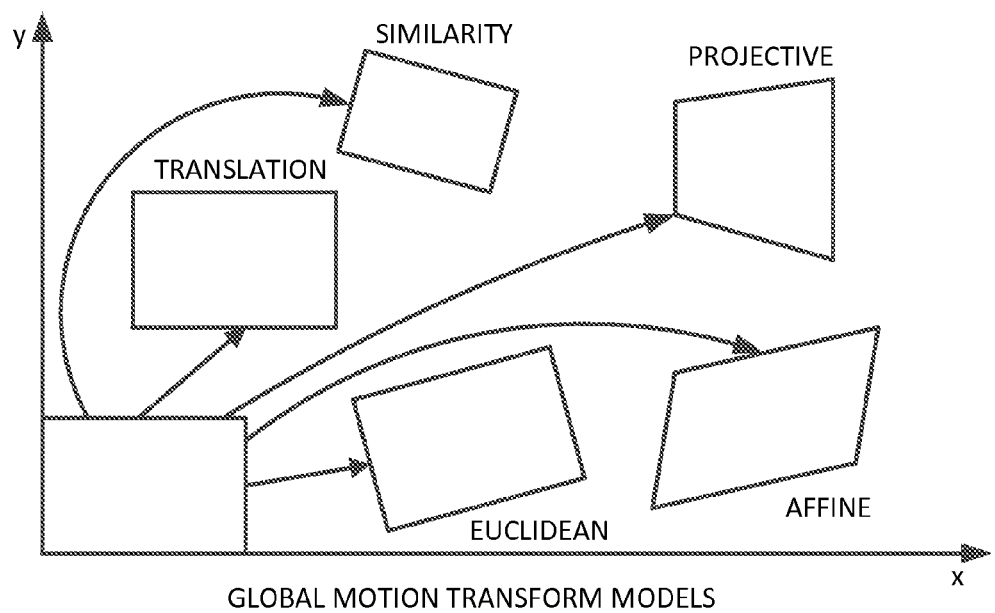
FIG. 14 is a diagram illustrating global motion transform models, including a similarity model of global motion transform as can be used with the image alignment technique of FIG. 8.

FIG. 14 illustrates various global motion transform models that can be used to estimate differences between the images taken at different exposure levels and resulting from hand shakiness or time evolution. The possible global motion transform models include translation similarity, Euclidean, projective, and affine motion transform models. In certain desirable embodiments, the global motion transform processing uses the similarity global transform model with translation, rotation and zoom parameters as shown in the following equation (3):

$$\begin{bmatrix} x' \\ y' \\ 1 \end{bmatrix} = \begin{bmatrix} s\cos\beta & s\sin\beta & tx \\ -s\sin\beta & s\cos\beta & ty \\ 0 & 0 & 1 \end{bmatrix} \cdot \begin{bmatrix} x \\ y \\ 1 \end{bmatrix} \quad (3)$$

where x and y are the original position, x' and y' are the transformed position, and s, $\beta$, $t_x$, $t_y$ are zoom, rotation and translation parameters, respectively.

In general, most users will experience shaky motion effects on translation, rotation and zoom only. Accordingly, the similarity motion transform model of equation (3) is well suited to account for hand shakiness or time evolution between images of different exposure levels which are then used to create a single HDR image. However, alternative implementations of the global motion transform estimation could use other models that model additional or fewer aspects of image jitter from hand shakiness or time evolution.

Figure 15:
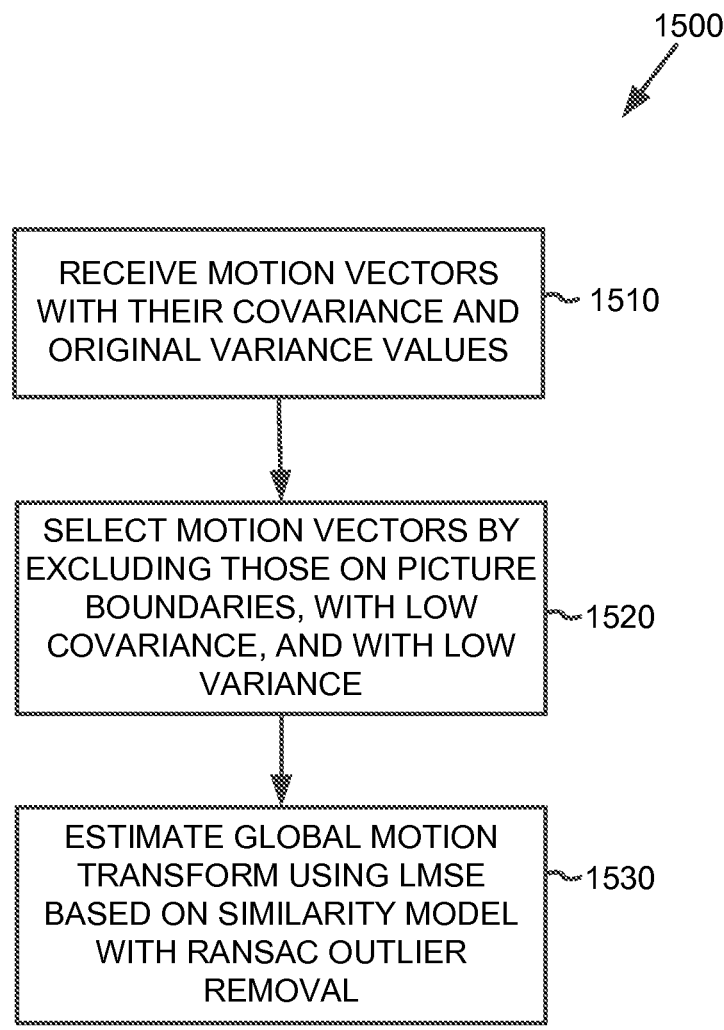
FIG. 15 is a flow chart showing a process for estimating a global motion transform as can be used with the image alignment technique of FIG. 8.

FIG. 15 is a flow chart illustrating an exemplary method 1500 for estimating global motion transform between images, which is suitable for aligning a non-reference image (e.g., a low exposure image or a high exposure image) to a reference image (e.g., a mid exposure image) as part of the HDR image generation method illustrated in FIG. 6. In particular, the method 1500 of estimating a global motion transform can be used at process block 840 of FIG. 8.

At 1510, motion vector information between the non-reference image and the reference image is received (e.g., loaded, buffered into memory, or otherwise accessed or prepared for further processing). In certain implementations, covariance information (e.g., covariance information for each block in the image produced during local motion estimation at process block 820 of FIG. 8) and/or original variance information (e.g., variance information about each block in the original images).

At 1520, a set of the motion vectors are selected upon which to base the global motion transform estimation. The motion vectors selected can be motion vectors determined to be more reliable than other motion vectors. In one example implementation, the method 1500 selects motion vectors based on one or more rules. One rule, for example, can be that the motion vectors on picture boundaries are not reliable, and therefore are not selected. For example, camera motion that occurs from image to image can cause the boundary blocks to be partially missing. A further rule can be that blocks that have an original variance value that is below a certain threshold are unreliable, and therefore are not selected. The original variance value measures the relative difference between the pixel sample values in the block. A low value indicates that the pixel sample values in the corresponding block are largely similar or identical to one another. Such low variance values typically occur in areas of a scene that have a large space of a similar color (e.g., a blue sky). On account of the lack of texture or edges, such blocks are not good candidates for producing reliable motion vectors. The threshold value can vary from implementation to implementation but is selected to help eliminate motion vectors that are associated with large smooth spaces in the image. In certain embodiments, all three rules can be used, though fewer or additional criteria of reliability can also be used.

At 1530, an estimate of the global motion transform is computed for the images (e.g., for the relative movement of the non-reference image in relation to the reference image, or vice versa). In certain embodiments, the global motion transform is estimated using equation (3) for the similarity global motion model discussed above. Alternatively, the global motion transform can be estimated based on another motion model.

For estimating the global motion transform, embodiments of the method 1500 also use a Random Sample Consensus ("RANSAC") method to detect and eliminate motion vectors that are outliers. In the RANSAC method, two motion vectors are chosen at random out of the set of motion vectors selected at 1520. The motion vector processing then solves equation (3) using a Least Mean Square Error ("LMSE") fit to determine values of s, β, $t_x$, $t_y$ parameters for the two randomly selected motion vectors. The RANSAC method then determines a number of the other motion vectors that also are consistent with this solution of the global motion transform equation parameters. The RANSAC method repeats the random selection of other pairs of motion vectors until a largest group of motion vectors consistent with the solution is found. This eliminates motion vectors that are considered outliers, or inconsistent with the consensus LMSE solution for the parameters of the global motion transform.

D. Image Warping with Global Motion Transform

With reference again to FIG. 8, the digital image alignment process 800 performs image warping 850 based on the global motion transform (e.g., the global motion transform from method 1500) and produces an aligned version of the non-reference image. For example, the image warping can be performed by a GPU (e.g., using the GPU D3D APIs) with bilinear interpolation and/or using a customized bi-cubic vertex shader to apply an image warping in a direction corresponding to the estimate of global motion transform due to jittery motion. Furthermore, in certain implementations, missing pixels after warping are not used for HDR image generation.

VI. Concluding Remarks

Any of the methods described herein can be performed by computer-executable instructions stored on one or more non-transitory computer-readable media (e.g., storage or other tangible media). Operations can be fully automatic, semi-automatic, or involve manual intervention.

Having described and illustrated the principles of our invention with reference to the described embodiments, it will be recognized that the described embodiments can be modified in arrangement and detail without departing from such principles. It should be understood, for example, that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. One or more non-transitory computer-readable media storing computer-executable instructions which when executed by a computer cause the computer to perform a method, the method comprising:
   receiving a reference image, the reference image comprising a digital image at a first exposure level and at a first time;
   receiving a non-reference image, the reference image comprising a digital image at a second exposure level and at a second time, the second exposure level being different than the first exposure level, and the second time being different than the first time;
   estimating two or more local motion vectors for the non-reference image relative to the reference image, the estimating of the two or more local motion vectors comprising:
   downsampling the non-reference image and the reference image one or more times to form a plurality of versions of the non-reference image and the reference image at a plurality of resolutions, wherein a lowest resolution version of the non-reference image has a plurality of blocks associated as a pyramid structure to a successively larger number of blocks at corresponding locations in each higher resolution version of the non-reference image, and wherein a lowest resolution version of the reference image has a plurality of blocks associated as a pyramid structure to a successively larger number of blocks at corresponding locations in each higher resolution version of the reference image;
   for the lowest resolution version of the non-reference image, estimating motion vectors of the blocks of the non-reference image by performing a search for motion vectors in the associated lowest resolution version of the reference image, wherein the search comprises searching for matching blocks at nearby block locations then expanding the search; and
   for each successively higher resolution version of the non-reference image, estimating motion vectors of the blocks of the successively higher resolution version of the non-reference image using a refinement search starting from the motion vector estimated for the associated block of the preceding lower resolution version of the non-reference image according to the pyramid structure.

2. The one or more computer-readable media of claim 1, wherein the method further comprises estimating a global motion transform based at least in part on the two or more local motion vectors.

3. The one or more computer-readable media of claim 2, wherein the method further comprises performing image warping on the non-reference image based at least in part on the global motion transform in order to compensate for motion between the non-reference image and the reference image.

4. The one or more computer-readable media of claim 2, wherein the estimating a global motion transform comprises selecting a subset of the two or more motion vectors for use in estimating the global motion transform, the selecting the subset of motion vector comprising one or more of (a) excluding motion vectors on image boundaries; (b) excluding motion vectors for blocks having an associated covariance value that fails to exceed a covariance threshold; or (c) excluding motion vectors for block that have an image content variation value that fails to exceed a content variation threshold.

5. The one or more computer-readable media of claim 2, wherein the estimating the global motion transform comprises using a random sample consensus method for removing outlier motion vectors.

6. The one or more computer-readable media of claim 1, wherein the performing the full search for motion vectors comprises computing covariance values between a block in the lowest resolution version of the reference image and two or more candidate blocks in the associated lowest resolution version of the non-reference image, or computing covariance values between a block in the lowest resolution version of the non-reference image and two or more candidate blocks in the associated lowest resolution version of the reference image.

7. The one or more computer-readable media of claim 1, wherein the estimating two or more local motion vectors is performed using a metric that measures a degree to which pixel values of a block in the non-reference image change together with pixel values of a block in the reference image.

8. A digital image processing device for generating HDR images, the digital image processing device comprising:
   a memory storing an image alignment program;
   at least one digital signal processing component;
   a processing unit operable to execute the image alignment program, wherein said execution of the image alignment program causes the processing unit to:
      input a reference image, the reference image comprising a digital image at a first exposure level and at a first time;
      input a non-reference image, the reference image comprising a digital image at a second exposure level and at a second time, the second exposure level being different than the first exposure level, and the second time being different than the first time; and
      compute a local motion vector for a block of pixel sample values in the non-reference image indicating relative motion of the block to a corresponding block of pixel sample values in the reference image, the local motion vector being determined at least in part using a metric measuring how the pixel sample values in the block in the non-reference image change together with the pixel sample values in the block in the reference image.

9. The digital image processing device of claim 8, wherein the metric is the covariance between the pixel sample values in the block in the non-reference image and the pixel sample values in the block in the reference image.

10. A method, the method comprising:
    by computing hardware:
       receiving a reference image, the reference image comprising a digital image at a first exposure level and at a first time;
       receiving a non-reference image, the reference image comprising a digital image at a second exposure level and at a second time, the second exposure level being different than the first exposure level, and the second time being different than the first time;
       estimating two or more local motion vectors for the non-reference image relative to the reference image, the estimating of the two or more local motion vectors comprising:
          downsampling the non-reference image and the reference image one or more times to form a plurality of versions of the non-reference image and the reference image at a plurality of resolutions, wherein a lowest resolution version of the non-reference image has a plurality of blocks associated as a pyramid structure to a successively larger number of blocks at corresponding locations in each higher resolution version of the non-reference image, and wherein a lowest resolution version of the reference image has a plurality of blocks associated as a pyramid structure to a successively larger number of blocks at corresponding locations in each higher resolution version of the reference image;
          for the lowest resolution version of the non-reference image, estimating motion vectors of the blocks of the non-reference image by performing a search for motion vectors in the associated lowest resolution version of the reference image, wherein the search comprises searching for matching blocks at nearby block locations then expanding the search; and
          for each successively higher resolution version of the non-reference image, estimating motion vectors of the blocks of the successively higher resolution version of the non-reference image using a refinement search starting from the motion vector estimated for the associated block of the preceding lower resolution version of the non-reference image according to the pyramid structure.

11. The method of claim 10, wherein the method further comprises estimating a global motion transform based at least in part on the two or more local motion vectors.

12. The method of claim 11, wherein the method further comprises performing image warping on the non-reference image based at least in part on the global motion transform in order to compensate for motion between the non-reference image and the reference image.

13. The method of claim 11, wherein the estimating a global motion transform comprises selecting a subset of the two or more motion vectors for use in estimating the global motion transform, the selecting the subset of motion vector comprising one or more of (a) excluding motion vectors on image boundaries; (b) excluding motion vectors for blocks having an associated covariance value that fails to exceed a covariance threshold; or (c) excluding motion vectors for block that have an image content variation value that fails to exceed a content variation threshold.

14. The method of claim 11, wherein the estimating the global motion transform comprises using a random sample consensus method for removing outlier motion vectors.

15. The method of claim 10, wherein the performing the search for motion vectors comprises computing covariance values between a block in the lowest resolution version of the reference image and two or more candidate blocks in the associated lowest resolution version of the non-reference image, or computing covariance values between a block in the lowest resolution version of the non-reference image and two or more candidate blocks in the associated lowest resolution version of the reference image.

16. The method of claim 10, wherein the estimating two or more local motion vectors is performed using a metric that measures a degree to which pixel values of a block in the non-reference image change together with pixel values of a block in the reference image.

17. A digital image processing method for generating HDR images, the method comprising:
- by computing hardware:
    - inputting a reference image, the reference image comprising a digital image at a first exposure level and at a first time;
    - inputting a non-reference image, the reference image comprising a digital image at a second exposure level and at a second time, the second exposure level being different than the first exposure level, and the second time being different than the first time; and
    - computing a local motion vector for a block of pixel sample values in the non-reference image indicating relative motion of the block to a corresponding block of pixel sample values in the reference image, the local motion vector being determined at least in part using a metric measuring how the pixel sample values in the block in the non-reference image change together with the pixel sample values in the block in the reference image.

18. The digital image processing method of claim 17, wherein the metric is the covariance between the pixel sample values in the block in the non-reference image and the pixel sample values in the block in the reference image.

\* \* \* \* \*